US009685056B2

(12) United States Patent
Klimer

(10) Patent No.: US 9,685,056 B2
(45) Date of Patent: Jun. 20, 2017

(54) ROBUST CHANGE-DETECTION SYSTEM AND METHOD

(71) Applicant: QOGNIFY LTD., Ra'anana (IL)

(72) Inventor: Gideon J. Klimer, Holon (IL)

(73) Assignee: Qognify Ltd., Ra'anana (IL)

( * ) Notice: Subject to any disclaimer, the term of this patent is extended or adjusted under 35 U.S.C. 154(b) by 145 days.

(21) Appl. No.: 14/504,424

(22) Filed: Oct. 2, 2014

(65) Prior Publication Data
US 2015/0269745 A1 Sep. 24, 2015

Related U.S. Application Data

(60) Provisional application No. 61/968,616, filed on Mar. 21, 2014.

(51) Int. Cl.
| | | |
|---|---|---|
| G06T 7/00 | (2017.01) | |
| G08B 13/196 | (2006.01) | |
| G06T 7/262 | (2017.01) | |
| G06T 7/194 | (2017.01) | |

(52) U.S. Cl.
CPC ........ *G08B 13/19602* (2013.01); *G06T 7/194* (2017.01); *G06T 7/262* (2017.01); *G06T 2207/20021* (2013.01); *G06T 2207/20052* (2013.01); *G06T 2207/20064* (2013.01); *G06T 2207/20224* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 5,740,283 A * | 4/1998 | Meeker | ................... | G06T 9/004 382/248 |
| 5,818,969 A * | 10/1998 | Astle | ..................... | G06T 7/2026 348/699 |
| 6,304,606 B1 * | 10/2001 | Murashita | ............ | H04N 9/8047 375/240.18 |

(Continued)

OTHER PUBLICATIONS

Yeo et al. "Rapid Scene Analysis on Compressed Video," IEEE Transactions on Circuits and Systems for Video Technology, vol. 5, No. 6, Dec. 1995.*

*Primary Examiner* — Matthew Bella
*Assistant Examiner* — Soo Shin
(74) *Attorney, Agent, or Firm* — Pearl Cohen Zedek; Latzer Baratz LLP

(57) ABSTRACT

A system and method for detecting change in a video stream may include receiving, by a processor, a video image from a video stream and a reference image. The processor may divide the video image and the reference image into non-overlapping blocks, and each block in the video image may correspond to a block in the reference image. The processor may perform an orthogonal transformation on a corresponding pair of blocks in the video image and the reference image. DC (direct current, or, average value) components in the orthogonally transformed pair of blocks in the video image and the reference image may be zeroed. An infinity-norm difference between coefficient values of the corresponding pair of transformed and modified blocks in the video image and the reference image may be determined and compared to a threshold.

17 Claims, 8 Drawing Sheets

(56) References Cited

U.S. PATENT DOCUMENTS

| | | | | |
|---|---|---|---|---|
| 6,944,224 B2* | 9/2005 | Zhao | ............... | H04N 19/124 |
| | | | | 375/240.12 |
| 8,885,952 B1* | 11/2014 | Filip | ............... | G06F 17/30247 |
| | | | | 382/225 |
| 2003/0081833 A1* | 5/2003 | Tilton | ............... | G06K 9/0063 |
| | | | | 382/173 |
| 2004/0086152 A1* | 5/2004 | Kakarala | ............... | G06T 7/2053 |
| | | | | 382/103 |
| 2007/0127774 A1* | 6/2007 | Zhang | ............... | G06K 9/00771 |
| | | | | 382/103 |
| 2008/0158426 A1* | 7/2008 | Chiu | ............... | G06T 7/2033 |
| | | | | 348/607 |
| 2012/0177121 A1* | 7/2012 | Tripathi | ............... | G06T 7/0079 |
| | | | | 375/240.16 |

\* cited by examiner

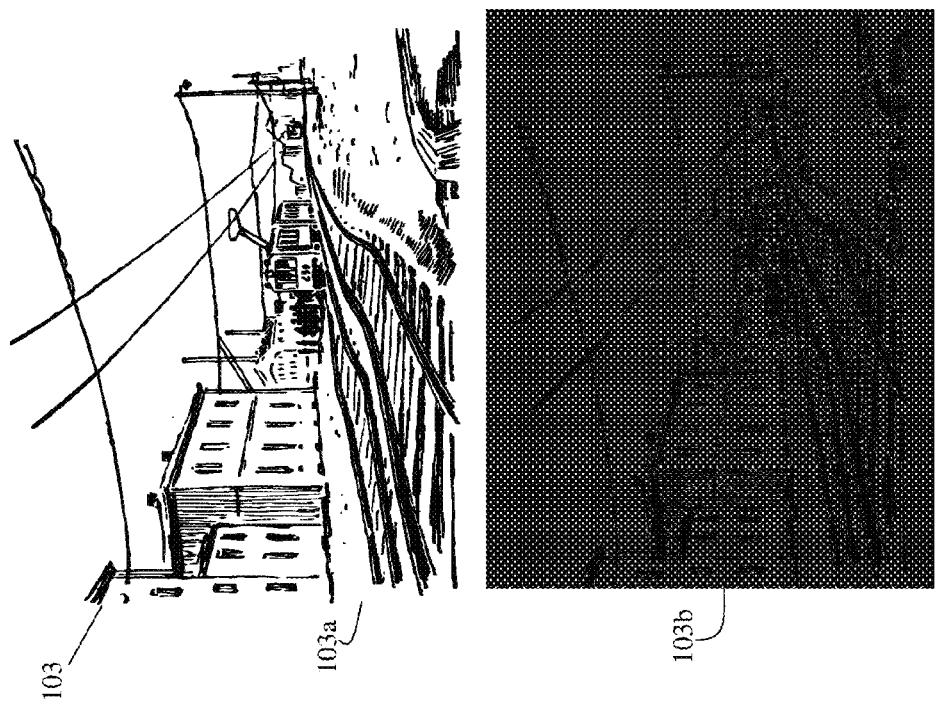
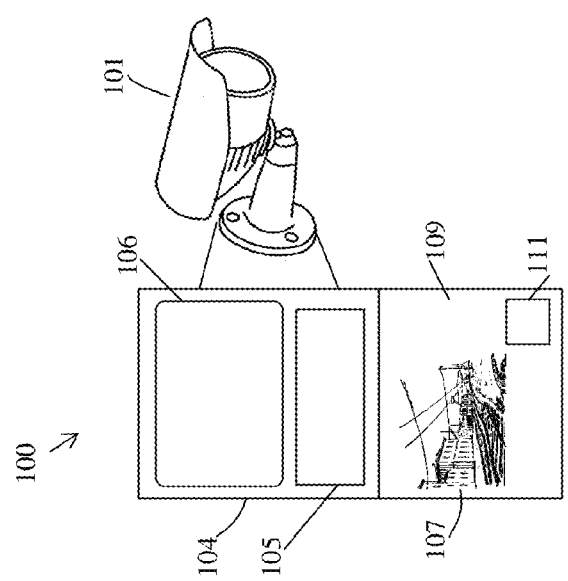
FIG. 1

ROBUST CHANGE-DETECTION SYSTEM AND METHOD

PRIOR APPLICATION DATA

The present application claims benefit from prior provisional application Ser. No. 61/968,616 filed on Mar. 21, 2014 and entitled "SYSTEM AND METHOD FOR ROBUST CHANGE-DETECTION METHOD" which is incorporated in its entirety herein by reference.

FIELD OF THE PRESENT INVENTION

The present invention relates to computer vision and video analytics systems.

BACKGROUND

Video surveillance and analytics systems may employ a background model (for example simple or complex) to distinguish "interesting" or notable changes in image frames originating in a live video stream or stored/archived video sequence (e.g., movie), from "non-interesting" static or quasi-static backgrounds. An interesting change can be any change that the operator wants to notice or be notified of—e.g., a person, or a person engaging in suspicious activity, or a suspicious object, or a target person or object, or a known person or object. An uninteresting change can be any change that the operator does not care to notice or be notified of—e.g., weather, animals, changes in lighting, natural phenomenon, etc. For example, a video surveillance system may use a reference image (supplied by the system's background model module) of a train station, and compare it with a video image of the train station. Differences between the video image and the reference image may indicate a suspicious situation, a disturbance in the train station or trespassing/intrusion, for example. The detected changes may be processed and analyzed to determine the types of change detected and whether an alert or other action is necessary. In general, the goals of an automated video surveillance system may be to maximize the probability of detecting changes that require alerts while also minimizing the probability of false alarms (e.g., spurious and non-desired alerts).

SUMMARY

A robust system and method for detecting change in a video stream may include receiving, by a processor, a video image from a video stream and a reference image from a background model module. The processor may divide the video image and the reference image into non-overlapping blocks, and each block in the video image may correspond to a block in the reference image. The processor may perform an orthogonal transformation on a corresponding pair of blocks in the video image and the reference image. DC (direct current, or, average value) components in the orthogonally transformed pair of blocks in the video image and the reference image may be zeroed. An infinity-norm difference between components (e.g., coefficient values) of the corresponding pair of transformed and modified blocks in the video image and the reference image may be determined and compared to a threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a video surveillance system for detecting change, according to embodiments of the invention.

Figure 2:
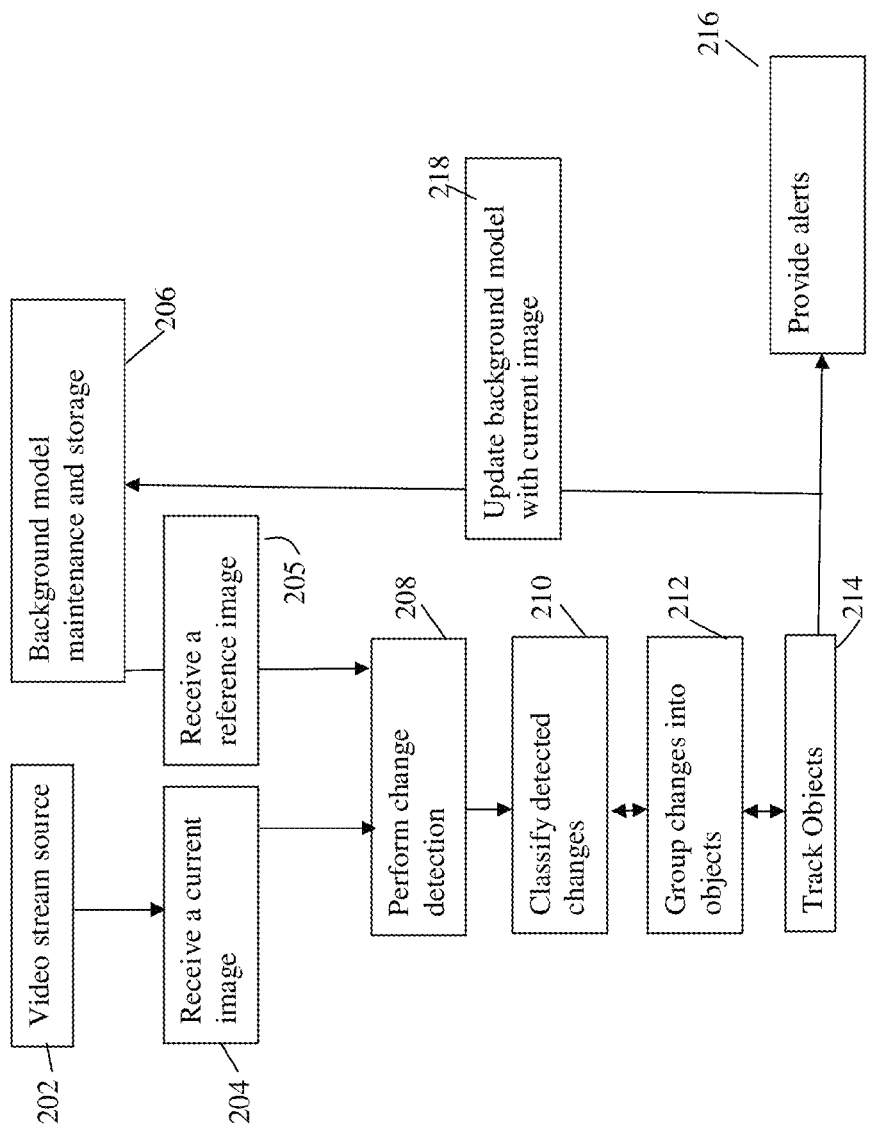
FIG. 2 is a block diagram of a robust change detection module within a video surveillance system, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may allow video surveillance or video analytics systems to detect changes or interesting objects in a video stream of an environment that is static or quasi-static. Embodiments of the system and method described herein may be robust to non-interesting background disturbances such as weather variations, sensor and signal noises within a video system, or other ordinary variations in a stream of images. Typical change-detection methods or algorithms may operate on the original pixel values of the video stream images and may also incorporate edge detection or directional derivatives (gradient) to determine changes within a video stream. Other methods may use a family of techniques known as "Local Binary Patterns" (LBP). These methods may be highly susceptible to brightness and contrast variations, and noise, and may require more processing when using regular color or black-and-white cameras (e.g., to handle overcast cloudiness conditions, etc.). With thermal cameras, these methods may not be effective due to additive Gaussian and speckle/shot noise types that are typical characteristics of images from thermal cameras and their sensors. Many types of disturbances may adversely affect typical change-detection methods. External weather effects may, for example, change illumination, brightness, and contrast in regular color or black-and-white cameras. In thermal cameras, cold temperature, fog, and steam may lead to considerably reduced contrast due to increased diffusion of the infrared thermal signatures reaching the thermal camera. In regular color or black-and-white cameras, low illumination conditions may be typically compensated by increasing the camera's gain (usually in some automatic fashion), however, this procedure may also amplify the noise originating from the sensor currents. Embodiments of the invention may be immune or robust to these issues in image quality, yet may reliably detect environmental changes that are of interest to the users of the video surveillance and analytics systems which incorporate embodiments of the invention. Consequently, embodiments of the invention may improve the performance of these systems.

A robust change detection method according to embodiments of the invention may detect changes by separately processing local areas, sections, blocks, or regions of an image in a video stream, for example. In each local area or region an orthogonal transform may be applied (e.g., Discrete Cosine Transform (DCT) or Fast Wavelet Transform (FWT)), followed by one or more modifications of the transform's results. The robustness to brightness and contrast variations (due to, e.g., weather conditions) may be achieved by the transform's energy compaction properties and the subsequent modifications or processing. The result may be sensitive to local patterns or textures, instead of pixel values, while simultaneously non-sensitive to random noise of various types (e.g., additive Gaussian and speckle/shot).

The video stream may be compared with a reference image, which may be supplied by the video surveillance and analytics system's background model module stored in memory or in a server, for example. The reference image may be a predetermined image that is stored permanently or temporarily in memory. This stored reference image may be for example slowly changing, quasi-static (rarely changing), or dynamic, or may be an image previous to (e.g. previous to in time of capture or previous to in the order of the video stream) a current video image being analyzed, or may be the k-th previous frame (for some k>1); the use of some previous frame as the reference shall be denoted "differential". This reference image may be considered as "non-interesting" static or quasi-static background. Some embodiments may detect the changes between an image frame and the reference frame provided by any chosen background model, while being robust to various disturbances, such as weather variations, sensor and signal noises within a video system, or other ordinary variations in a stream of images. The detection of changes between images in a video stream and reference images may produce an alert, such as a pop-up message, sound, or haptic alert, in a security system. Alerts may occur at a workstation of the security system, or the alerts may be sent to a personal device such as a smart phone or tablet connected to the security system by, for example, the Internet. The alert may cause security personnel to review the video stream around the image that produced the alert. If the security personnel still deems the change to be "non-interesting" or not a security threat, the security personnel may further choose to indicate that the image is to be included in the background model.

FIG. 1 is a video surveillance and analytics system 100 for detecting change, according to embodiments of the invention. A video camera 101 may monitor or survey a static or quasi-static background 103, such as a train station or an office lobby, for example. The video camera 101 may be a color or black-and-white video camera which detects or records visible light, or video camera 101 may be a thermal video camera which detects or records infrared thermal energy, or video camera 101 may be any other sensing and imaging device, using any relevant modality (for example, a radar-based imaging device which detects radio-frequency waves, or an imaging device which detects ultrasound waves). Video camera 101 may be coupled to a processor 105 or other computing system which performs analysis on a stream of images from the video camera 101. Processor 105 may receive a video image 103 from a video stream captured or recorded by the video camera 101, e.g. a sequence of still images. Video image 103 may be processed and compared to one or more reference images 107 which may be stored in memory 109 accessible by processor 105. Processing of the video image 103 may be in real-time, e.g., during a live feed, or may occur at a time later than when the video image was originally recorded (e.g., ten minutes, 3 days, 1 month or longer). Processing of the video image 103 and reference image 107 may include dividing the images into non-overlapping blocks (e.g., blocks which do not overlap in terms of regions of the image within the blocks) and performing an orthogonal transformation on the blocks. The blocks may be transformed or processed as arrays, lists, or other data structure. Processor 105 may further process the orthogonally transformed reference image 107 and orthogonally transformed video image 103 by applying filters 111 stored in memory 109, such as, but not limited to, an FIR (finite impulse response) filter, an IIR (infinite impulse response) filter (which may be applied in a forwards-backwards fashion), a morphological filter, or an order-statistics filter, for example. Video surveillance and analytics system 100 may be robust to uninteresting changes in the environment, or may avoid falsely identifying a change in the environment or background due to weather changes or noise. For example, video surveillance and analytics system 100 may monitor a scene or background 103a during the daytime or a background 103b during a snowy evening by comparing the images to a reference image 107 which may be supplied by the video surveillance and analytics system's background model module. As shown, video surveillance and analytics system 100 may determine that no changes are detected in background images 103a and 103b, even though weather and light changes have occurred and increased noise may be present. Processor or computing system 105 may display the video stream and the detected changes within the video stream. The video stream display and other output may be output or displayed to output device(s) 106, e.g., a computer monitor or other display or another output device such as a speaker. Processor or computing system 105 may further store the results or use images from the video stream as reference images, either in full or in part, according to the background model module.

While in one embodiment processor 105 is described as performing certain functionality, in other embodiments, multiple, distributed or different processors, or processors having different structures, may be used. Modules and systems described herein, such as a robust change detection module within a video analytics system, may be or may have their functionality performed by processor 105. Processor 105 may be part of a larger computing system 104, e.g., a server that analyzes video data. Processor 105 may be configured to perform steps described herein by executing software or encoded instructions. Video camera 101 may also be configured to perform steps described herein by including processors within video camera 101 or by executing software or encoded instructions. Memory, such as memory 109, may be configured to store images for comparison or analysis, such as reference images and video images, by storing them in hard drives, random access memory, or databases for example. Memory 109 may further be configured to store executable software or encoded instructions that are accessible by processor 105 or other processors.

FIG. 2 is a block diagram of a robust change detection module within a video surveillance and analytics system, according to embodiments of the invention. A video surveillance and analytics system (e.g., system 100 in FIG. 1) may use an image stream from a video stream source 202 such as a live video camera or a pre-recorded video sequence stored on a server, for example. From the video stream source 202, a video surveillance and analytics system may extract or receive a video image 204 depicting a scene reflecting a recent or present view of a place, such as a train station; it may occur that the recent or present view exhibits the background, without any "interesting" object or event. Video surveillance and analytics system may store or maintain a background model 206 in memory (e.g., memory 109 in FIG. 1), including one or more reference images that reflect or depict a previous view of the place being monitored. The background model 206 may be a separate module, for example, or may be fully integrated with the system. The background image may be a static image, for example, or may be periodically updated based on a predetermined time period prior to the present. The reference images may include scenes of the train station that are previously deemed normal, uninteresting, or not noteworthy, for example. A processor (e.g., processor 105) may receive a reference image 205 from the background model module 206. In operation 208, a processor may perform robust change detection using the video image and the reference image. The change detection method may determine whether an interesting change has occurred in the video image depicting a present scene and may include steps described in FIGS. 3-7, for example. The change detection method may also detect the location in the image where a change is occurring, e.g., at particular pixels or groups of pixels. In operation 210, the detected changes may be classified based on, for example, the proximity to other detected changes, as well as the result of the subsequent grouping operation 212, which considers, for example, shape, orientation, relative size, and location relative to other existing or newly-detected objects. In operation 212, the changes may be grouped into objects by grouping together changed blocks or pixels that neighbor or are close to each other, based on, for example, shape, orientation, relative size, and location relative to other existing or newly-detected objects. Classification of detected changes in operation 210 may be further based on the result of grouping changes into objects as described by operation 212, and tracking of objects as described by operation 214.

In operation 214, the objects may be tracked through each image in the video stream. The objects may be further analyzed, for example, by shape/image/facial recognition algorithms (e.g., in operation 212), and statistics-based methods. Based on the detection of tracked objects, and based on a pre-configured policy for issuing alerts, a user or automated video surveillance and analytics system may provide or produce alerts or alarms (e.g., via processor 105 in FIG. 1, output to output device(s) 106 such as a monitor or speaker) in operation 216 that indicate, danger, an interesting occurrence in the scene, or an event requiring some action or intervention from human operators, for example. If a tracked object is deemed not interesting or not a danger, the background model may be updated 218 to include the video image, or parts of it, as part of its reference images. Actions other than alerts may be taken based on detection of tracked objects.

Figure 3A:
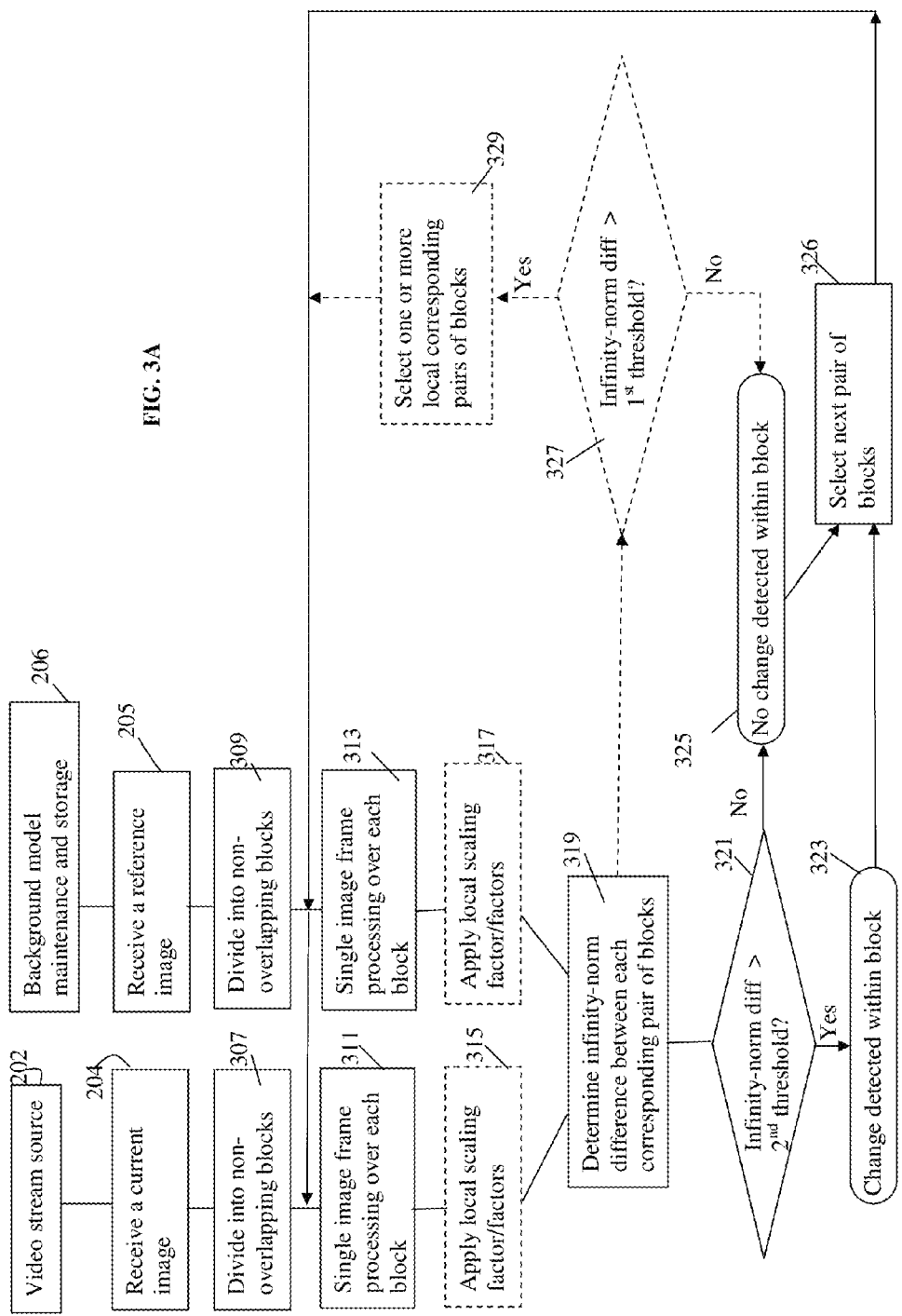
FIG. 3A is a block diagram of a method for robust change detection, according to embodiments of the invention.

FIG. 3A is a block diagram of a method for change detection, according to embodiments of the invention. As described in FIG. 2, a processor may receive a video image 204 from a video stream source 202 and receive a reference image 205 from a stored background model 206, for example. In operations 307 and 309, the video image and the reference image may each be logically split or divided into a logical grid of non-overlapping blocks (e.g., adjacent, bordering non-intersecting blocks, or sections that do not share any pixels with other blocks). In other embodiments, the video image and reference image may be unconditionally divided into overlapping blocks, although this may increase computational complexity when performed unconditionally. In contrast, an embodiment in which overlapping blocks are used conditionally may be described by operations 327 and 329. A block may be a rectangular group or array of pixels or component values, having dimensions of, for example, typically 8×8 or 16×16 pixels, or may be a list or linked list of the pixel values in a two-dimensional array; other sizes and dimensions may be used, or other kinds of data structures may represent the block. As explained further with respect to FIG. 3B, each block in the video image may have a corresponding block in the reference image, based on the pair of blocks being in the same position (e.g., having the same (x,y) coordinates relative to a picture edge or corner) within their respective images. If the reference image and the video image have different resolutions, pre-processing steps may be performed to determine corresponding blocks that detect the same area of a background or scene. In operations 311 and 313, each image may be processed over each of their divided blocks. The single image frame processing may include, for example, orthogonally transforming each of the blocks and modifying the orthogonally transformed blocks by zeroing the DC component (direct current, or, average value) of each orthogonally transformed block. Other modifications or processing of the orthogonally transformed blocks may follow. These processing operations are further described in FIG. 4. Zeroing the DC component of each orthogonally transformed block may include for example setting the DC component to zero or to a low, negligible value. Other processing may be used.

After the processing on a single image frame (including, but not limited to, the orthogonal transformation of the blocks and zeroing their DC components), which may be performed independently for the current video image and the reference image, other modifications, such as applying local scaling factors to the blocks in each image, may be further performed on the current video and reference images in operations 315 and 317.

In operation 319, a processor may then determine an infinity-norm difference between each corresponding pair of blocks. A corresponding pair of blocks may be a block in the video image and the block in the reference which corresponds to the block in the video image. As explained further with respect to FIG. 5, an infinity-norm difference for a particular pair of corresponding blocks may be determined by identifying or selecting the maximum absolute value from the differences between corresponding transformed (and modified) components within said pair of blocks. When the optional local scaling factor is applied, then prior to differencing pairs of corresponding blocks, optional normalization of each block may be performed using the appropriate local scale factor. An efficient implementation may perform multiplications by pre-computed inverse-values rather than divisions, and similar optimizations known in the art. If the reference image frame does not change often (e.g., it is static or quasi-static), it may be more computationally efficient to store it already scaled. For example, prior to receiving a video image from a video stream, the reference image may already be processed using orthogonal transformations and locally scaled for each block. Moreover, if the scale factors have been averaged over most of the image (so that the same scale factor is appropriate for most of the image), then instead of normalizing image blocks, it may be more computationally efficient to multiply the thresholds with which pairs of blocks are compared (described below).

At operation 321, the infinity-norm difference may be compared to a predetermined threshold. In embodiments which include operations 327 and 329 (described below), this threshold is denoted as "second threshold". The threshold may indicate whether a particular block in the video image has enough of a difference with a corresponding block in the reference image to signify a change within the block. For example, a surveillance system may, at operation 323, detect a change within the block in the video image if the infinity-norm difference is greater than the threshold. If the infinity-norm difference is not greater than the predetermined threshold (less than or equal to it), a processor may determine that no change is detected within the block at operation 325. The next pair of blocks may be selected in operation 326 for processing and for determining an infinity-norm difference (as in operation 319).

In some embodiments, prior to comparing the infinity-norm difference with the threshold indicating a change within a block in a video image (e.g., the second threshold described above), in operation 327, the infinity-norm difference may be compared to a first or initial threshold, which is lower than the second threshold, for the purpose of refining the detection of "interesting" areas in an image frame. Since blocks may be defined as groups of pixels (e.g., 8×8 pixels), an object detected within the video image may have a reduced spatial resolution (e.g., reduced by 8 in each of x and y dimensions when using blocks of 8×8 pixels). If a first pair of corresponding orthogonally transformed (and modified) blocks, created in the initial division of non-overlapping blocks, has an infinity-norm that is greater than the first threshold, then one or more surrounding local corresponding pairs of blocks may be selected at operation 329 for processing. These local corresponding pairs of blocks may overlap (e.g., share some pixels or portion of the image area) with the first corresponding pair of blocks created in the initial division of non-overlapping blocks. More pairs may also be selected. The other corresponding pairs of blocks may be processed in the same way as the first divided blocks from the initial division of non-overlapping blocks, e.g., the processing in operations 311, 313, 315, 317, and 319 in FIG. 3A. The second threshold in operation 321 which indicates a detected change is higher than the first or initial threshold in operation 327.

The results from the overlapping blocks may augment the results from the initial non-overlapping blocks, which may have already been computed; taken together, they may thereby recover the original spatial resolution, for "interesting" areas in an image frame. If the infinity-norm difference for any corresponding pair of blocks is not greater than the first threshold, then, since the first threshold is less than the second threshold, a processor may determine that a change is not detected within the respective block in the video image. For any corresponding pairs of blocks, a processor may detect a change within a block in the video image if the block's respective infinity-norm difference is greater than the second threshold. For example, the corresponding pairs of blocks may be from the initial division of blocks into non-overlapping blocks, or the corresponding pairs of blocks may be from another pair that overlaps with the originally divided blocks. When there exist overlapping blocks for which a change has been detected, then the change may be attributed at operation 323 only to a smaller radius or patch of pixels than the block size (e.g., smaller than 8×8 pixels when using blocks of 8×8 pixels), thereby improving the detection resolution for the "interesting" areas (e.g., obtaining detection resolution smaller than an 8-pixel resolution in each of x and/or y dimensions in the "interesting" areas when using blocks of 8×8 pixels).

Figure 3B:
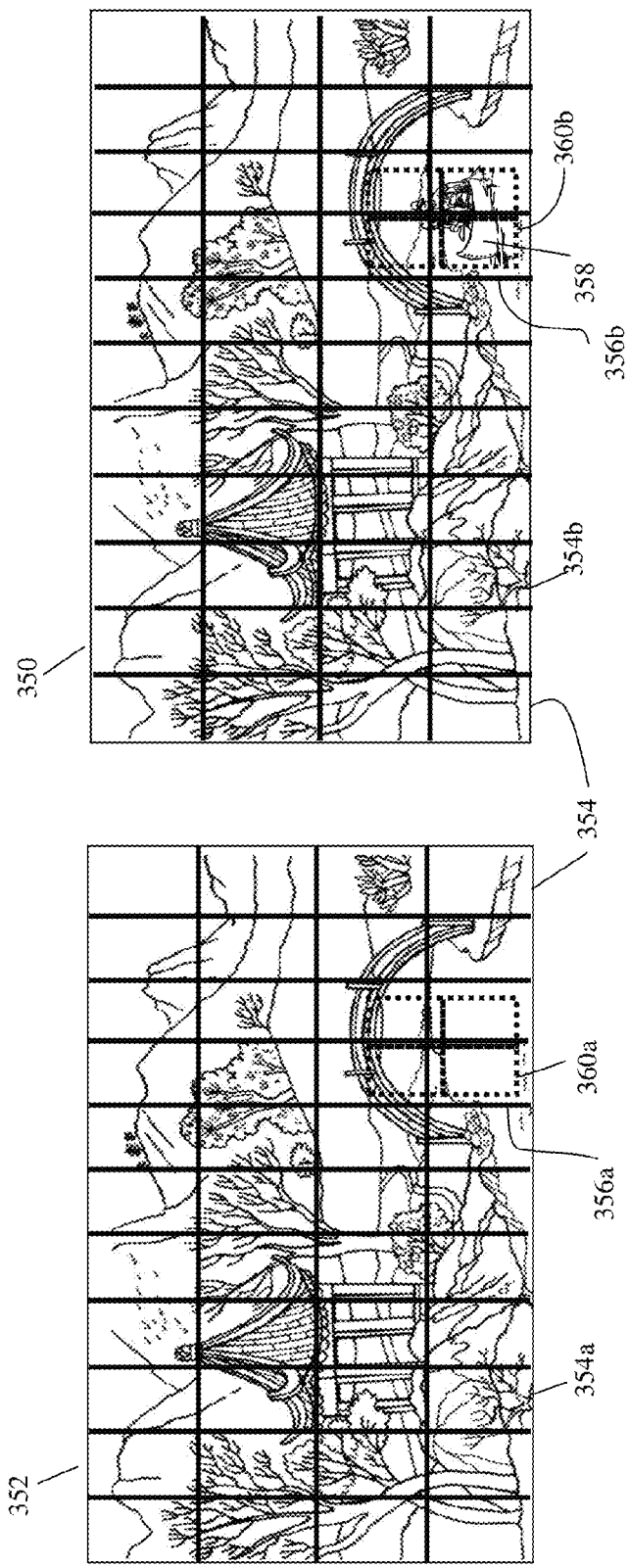
FIG. 3B is an illustration of a video image and a reference image divided into blocks, according to embodiments of the invention.

FIG. 3B is an illustration of a current or video image 350 and a reference image 352 separated or divided into blocks 354, according to embodiments of the invention. The blocks in the video image and the reference image may be non-overlapping, e.g., neighboring blocks 354 may not share any pixels. As shown, blocks may be a regular polygon or tiling of the plane, such as a square or rectangle so that they can be easily repeated and iterated through. Moreover, the shape and size of blocks may vary over the image frame, in order to provide increased or decreased detection capabilities, or to reduce processing requirements, for example.

Each block in the video image may have a corresponding block in the reference image due to having the same position or including the same pixel positions in their respective video or reference image. For example, block 354a in reference image 352 may correspond or relate to block 354b in current or video image 350. A video image may be "current" because it may come from a live video stream, for example. Each pair of corresponding blocks (e.g., 354a and 354b) may be processed individually by orthogonally transforming the pair of blocks and modifying the orthogonally transformed pairs of blocks by zeroing the DC component from each of the orthogonally transformed blocks, and further zeroing low-magnitude components, scaling them, and then determining the infinity-norm difference between the blocks (e.g., the processing and modifications described in operations 404, 406, 408, and 410 in FIG. 4, and operations 315, 317, and 319 in FIG. 3A). The infinity-norm difference between each corresponding pair of blocks may, for example, be compared to a threshold to detect a change between them. An alert or alarm may be provided or produced based on the detected change, e.g., an alert may be provided if the infinity-norm difference is greater than a threshold. The alert may be a haptic cue, sound, a visual cue, or a pop-up message, for example. In some embodiments, different alerts may be provided depending on the value of the infinity-norm difference. A greater infinity-norm difference above the threshold may produce a more intrusive alert, for example, such as a sound having greater intensity or volume. In one example, a method for robust change detection may attempt to recover the original spatial resolution of an image by, e.g., comparing the infinity-norm difference in a block to an initial threshold that is less than the threshold used to determine whether a change is affirmatively detected within the block (such as in operation 327 of FIG. 3A).

As shown in FIG. 3B, a pair of blocks 356a in the reference image 352 and its corresponding block 356b in the video image 350 may have an infinity-norm difference greater than the initial threshold, due to some change, irregularities, or object 358 identified within block 356b that differs from the corresponding block 356a in the reference image 352. A set of corresponding pairs of blocks 360a and 360b local to the first corresponding pair of blocks 356a and 356b, respectively, may be selected for further processing to determine whether a change exists between the set of local blocks 360a in the reference image and 360b in the video image. The selection of a local set of corresponding blocks 360a and 360b may overlap (e.g., share one or more pixels) with the first corresponding pair of blocks 356a and 356b. As shown, the local corresponding pairs of blocks 360a and 360b may be smaller than the first corresponding pair of blocks 356a and 356b, respectively, or may have the same size. The selected local pairs of corresponding blocks 360a and 360b may be processed, iterated, or repeated through the same steps as applied to the first corresponding pairs of blocks 356a and 356b (e.g., the operations 404, 406, 408, and 410 in FIG. 4, which correspond to operations 311 and 313 in FIG. 3A, and operations 315, 317, and 319 in FIG. 3A). Smaller local sets of corresponding blocks may also be iteratively processed through operations 311 to 319 until a predetermined time, number of iterations, a dynamically set limit, a suitable infinity-norm difference threshold is reached, or until a spatial resolution threshold is recovered. The blocks that are deemed to include a change may be for example highlighted in the video stream (e.g., displayed on output device(s) 106), or an alert or other signal may be produced based on the detected changes within the blocks (e.g., displayed on output device(s) 106). Other output may be produced.

Figure 4:
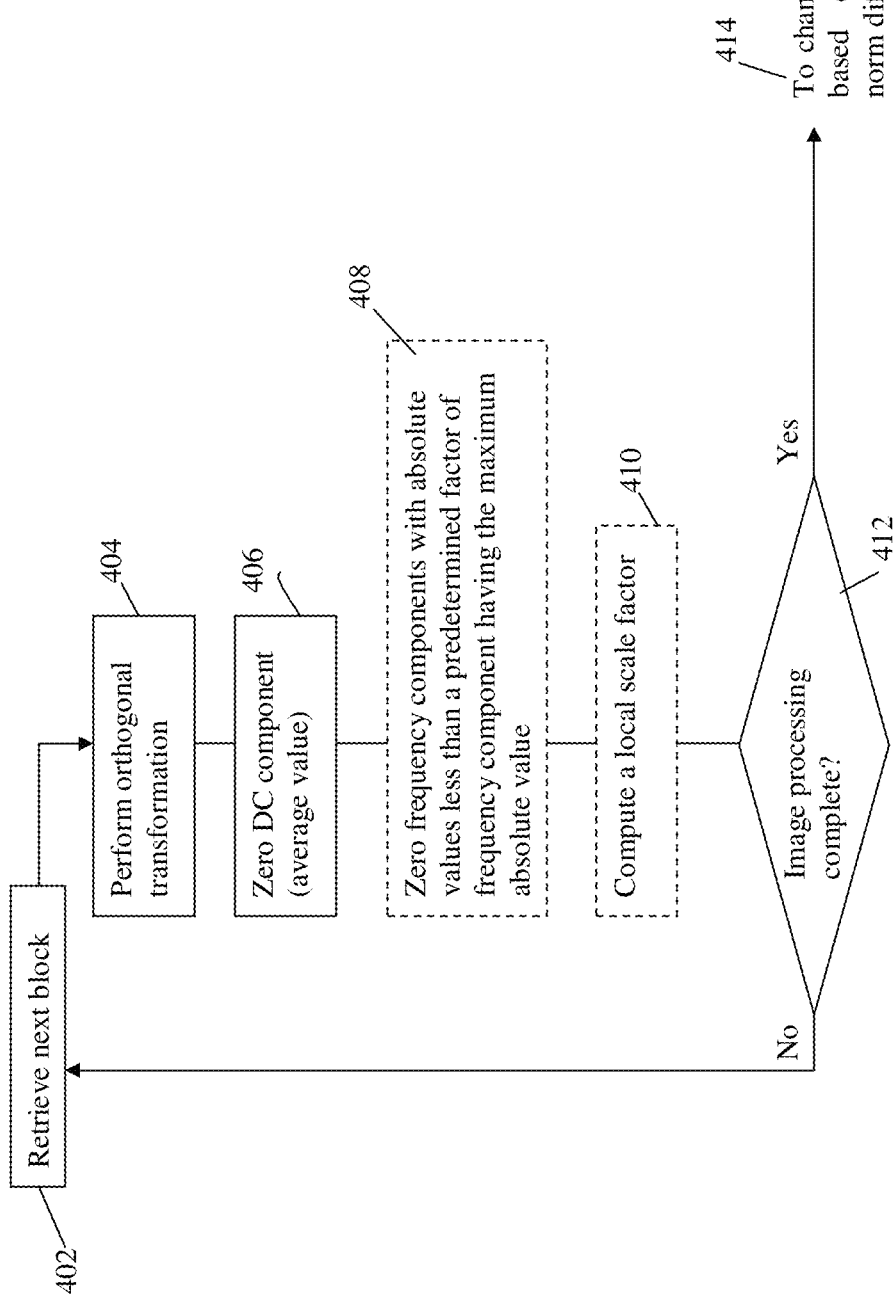
FIG. 4 is a block diagram of performing orthogonal transformations of each block in a video and reference image, according to embodiments of the invention.

FIG. 4 is a block diagram of a method of performing orthogonal transformations and other modifications of each block in a video or reference image, according to embodiments of the invention. The operations described in FIG. 4 may occur in operation 311 and/or operation 313 of FIG. 3A, for example. Since the processing of blocks may be performed independently from one another (e.g., processing in one block may not affect or require results from processing in another block), per-block processing within processing system 105 can be performed using multiple, distributed or different processors, so that it occurs simultaneously on multiple different blocks, for example. Moreover, blocks may be processed in any order within an image, and the processing of blocks from different images (e.g., blocks in the current video image and reference image) can be intertwined or delayed, for example. Operations 402 and 412 describe an example control logic for retrieving the appropriate blocks from the image memory. The per-block processing may include an orthogonal transformation on each block in operation 404, followed by a further modification of the orthogonally transformed blocks in operation 406 (zeroing the component corresponding to the average value), followed by operation 408 with another modification (zeroing some low-magnitude components), and then operation 410 where an optional local scaling factor may be computed, for example. In operation 404, a processor may perform an orthogonal transformation with energy compaction properties on the block. The orthogonal transformation may be, for example, a discrete cosine transform (DCT) or a fast wavelet transform (FWT). An orthogonal transformation may be series of steps or equations applied to a matrix, such as each block in the video image or the reference image, which transforms the vector space of each block such that each column and row is an orthogonal unit vector. Orthogonal unit vectors may be both orthogonal (perpendicular) to each other and may each have a fixed constant length (Euclidean norm) of 1 (thus called "unit vectors"). In other embodiments, the length (Euclidean norm) of the vectors may be a fixed constant other than 1. A processor may perform an orthogonal transformation on a block. The orthogonal transformation may produce a transformed block, having, for example, the same size and shape as the original block prior to the orthogonal transformation (e.g., a matrix). In other embodiments, the orthogonal transformation may produce a result as a set of values organized as a list, or as an array, for example. A discrete cosine transform (DCT) may, for example, express a finite sequence of data points in terms of a sum of cosine functions oscillating at different frequencies. A DCT may be used because it has a strong energy compaction property on typical images, e.g., most of the signal information from typical images may be concentrated in a few low-frequency components of the DCT, in contrast to white noise, which may typically have signal information distributed evenly among all components, on average. The energy compaction properties of DCT are well-known in the art. A fast wavelet transform (FWT) may express a similar finite sequence in terms of a small wave-like oscillation, e.g., a wavelet, that begins at zero, increases, and then decreases back to zero, while having oscillations in-between its endpoints. Other orthogonal transformations may be used, such as the discrete Fourier transform, for example. However, the discrete Fourier transform may have energy compaction properties that are not as good as the energy compaction properties of the DCT or FWT on typical images. A preferred embodiment may take advantage of known methods for reducing the number of calculations associated with the chosen orthogonal transform. The term "component" refers to the set of results of the orthogonal transformation on a block of pixels, e.g., the coefficients of its basis (for example, when the transformation is a discrete cosine transform, DCT, the "components" refers to the set of coefficients corresponding to distinct frequencies which are the basis for the DCT).

Per-block processing (e.g., including orthogonal transformation and subsequent modification) may be performed in any order, for example, one block in the video image may be processed before a corresponding block in the reference image. In other embodiments, all the blocks in the video image may be processed before or after all the blocks in the reference image are processed. For a reference image that is a predetermined stored image or a rarely-changing image, for example, the reference image, its blocks, and its processed blocks may be stored separately, in a manner such that processing of the reference image is reduced to a minimum. This may save processing power, because a processor need only process video images instead of processing both reference and video images for obtaining comparisons. Different block sizes of the reference image may be orthogonally transformed and stored for later use, for example.

In operation 406, the transform component in each block corresponding to the constant average value (known as the "DC (direct current) value") may be zeroed. For example, each orthogonally transformed block may be a matrix of coefficients that correspond to discrete functions having particular frequencies, depending on the (x,y) coordinate of the coefficient. The upper left corner of a block may be the origin having an (x,y) coordinate of (0,0). For an 8×8 block, for example, each pixel to the right or each pixel below the origin of (0,0) may correspond to an increase in frequency by a half cycle. The origin may typically yield a scalar value without frequency components. This value in each block may be the DC component of an orthogonal transformation and may be zeroed or set to zero value by a processor, for example.

In operation 408, the transform components in each block whose absolute values are much smaller than the component with maximum absolute value (e.g., smaller than a fixed positive factor of the maximum absolute value) may be zeroed. This step may have less of an effect (e.g., it has negligible impact on the change-detection performance), and hence may be eliminated in a preferred embodiment, in order to conserve total processing effort.

In operation 410, a local scaling factor may be computed on the block. The local scaling factor may be computed as each block is processed or after each block is processed. For each block, following the modifications described above, a local scale factor may be computed as the average value of the absolute values, or squared absolute values, or the maximum absolute value of the orthogonal transform components within the current said block and the blocks surrounding the current said block. The number of neighbor blocks used for this averaging may be a configurable design parameter (for example, 8, 24, or 48 neighbor blocks, but more may be used). When averaging the scale factors over neighboring blocks, it is obvious that all blocks participating in the averaging should have already been transformed. The choice between averaging of absolute values, or squared absolute values, or the maximum absolute values, may also be a configurable design parameter. Additionally, the scale factor may be averaged over time, utilizing known methods, such as a short FIR filter, or 1-pole IIR filter. The type of filter for averaging over time, and its effective memory, are configurable design parameters. Averaging operations may be computed efficiently by computing partial intermediate results and subsequently combining them. For example, after partial results per block, these intermediate results may be averaged between neighboring blocks and/or over time. In a preferred embodiment, this local scale factor calculation may be performed only in the reference frame image (and not for the current video frame image), in order to conserve total processing effort. A preferred embodiment may average the maximum absolute values of the transform components from all blocks except from blocks adjacent to the borders of the image (e.g., averaging over most of the image), and then average over time utilizing a 1-pole IIR filter. In operation 412, a processor may check to see if image processing over all blocks in a video or reference image is complete. If not, the processor may retrieve the next block 402 in the image to be processed and iterate through operations 404-410. If image processing is complete, e.g., all blocks have been processed in an image, then change detection may progress to the next step, e.g., to operations 315 and 317 in FIG. 3A.

Figure 5:
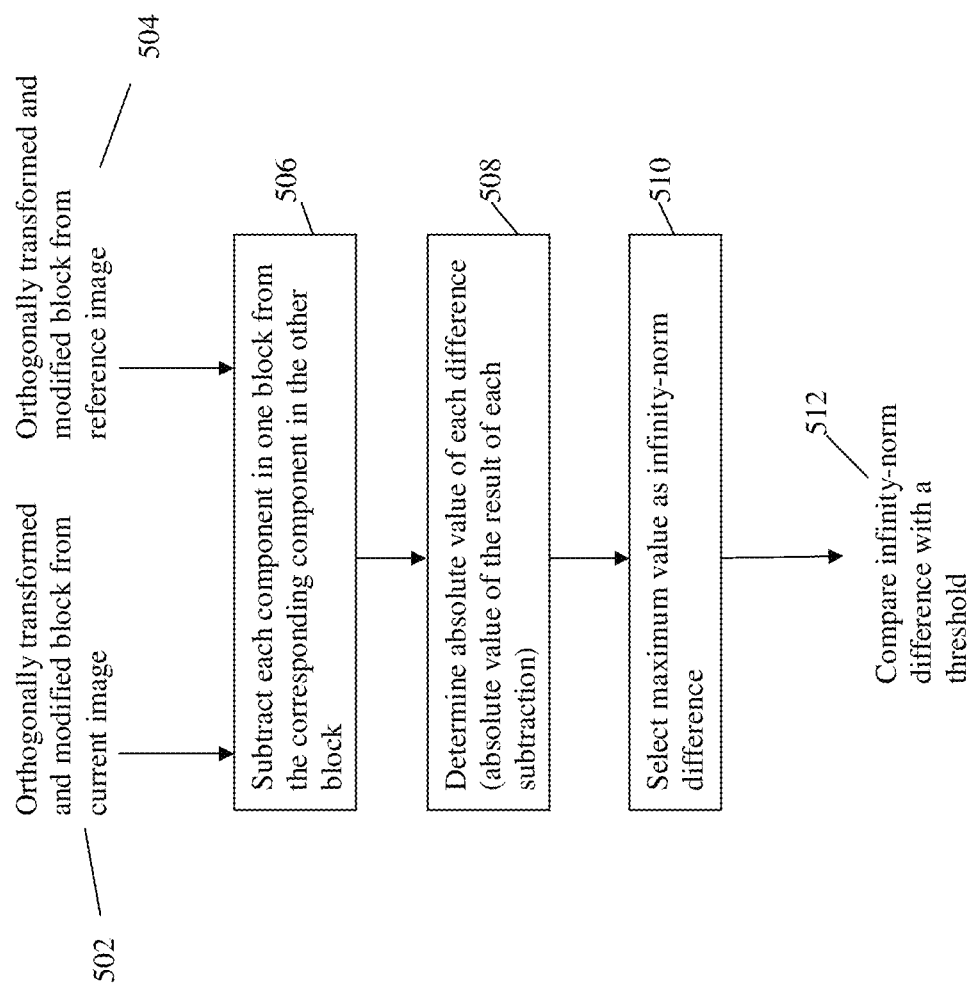
FIG. 5 is a block diagram of determining an infinity-norm difference between corresponding pairs of orthogonally transformed blocks, according to embodiments of the invention.

FIG. 5 is a block diagram of determining an infinity-norm difference between corresponding pairs of orthogonally transformed and modified blocks, according to embodiments of the invention. The operations described in FIG. 5 may occur in operation 319 of FIG. 3A, for example. The infinity-norm difference may be determined or calculated on corresponding pairs of modified orthogonally transformed blocks in the video image 502 and the reference image 504. In operation 506, a processor may subtract each component in one block of a video image from the corresponding component in the corresponding block of the reference image. The term "component" refers to the set of results of the orthogonal transformation on a block of pixels, e.g., the coefficients of its basis (for example, when the transformation is a discrete cosine transform, DCT, the "components" refers to the set of coefficients corresponding to distinct frequencies which are the basis for the DCT). Since blocks in the video image and reference image may have the same dimensions as each other, e.g., 8×8 or 16×16 (or other sizes), the blocks may have the same number of pixels, and their corresponding transforms may have the same number of components, which are in the same relative positions. The subtraction of one transformed and modified block (e.g., a list, array, or matrix of modified transform components) in a video image from a corresponding transformed and modified block in a reference image may result in a difference list/array/matrix with the same number of elements as the dimensions of the blocks. In operation 508, the absolute value of each subtraction may be determined, resulting in a list, array, or matrix of non-negative values. In operation 510, the infinity-norm of the differences may be determined for each corresponding pair of blocks by selecting the maximum value from the resulting list/array/matrix of operation 508. The infinity-norm of the differences may be compared to a threshold 512 to determine if a change is detected within the block in the video image (e.g., operation 321 in FIG. 3A) and optionally, to recover the original image resolution (e.g., operation 327 in FIG. 3A).

Figure 6:
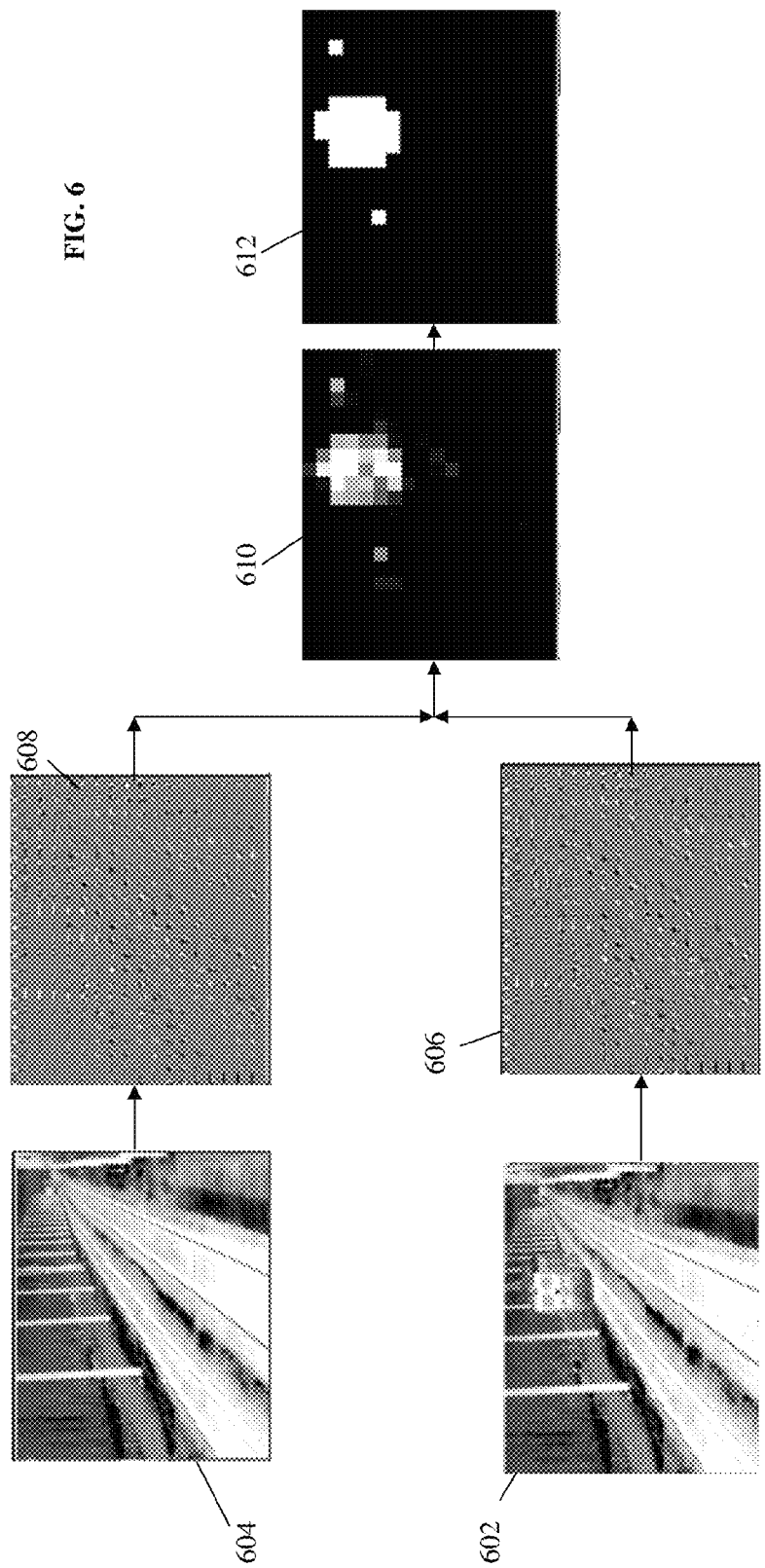
FIG. 6 is an illustration of processed images using a robust detection method, according to embodiments of the invention.

FIG. 6 is an illustration of processed example images using a robust change detection method, according to embodiments of the invention. A processor may receive a video image 602 and a reference (background) image 604 of a scene for surveillance. The video image 602 and reference image 604 may be processed by, for example, splitting or dividing the images into non-overlapping blocks and orthogonally transforming and modifying each block. Since the blocks in the example are non-overlapping, and since the result of each transform of a block has the same number of elements (e.g., components) as the original block had pixels, then it is possible to visualize the result of a transformed and modified block by displaying it as an image; In this manner, the orthogonally transformed and modified results of the video image and reference image may be visualized as image 606 and image 608, respectively. The results of the orthogonally transformed and modified video image and reference image may be compared by determining the infinity-norm difference between corresponding pairs of blocks. The infinity-norm difference may be visualized for each block in image 610. The infinity-norm difference in each block may be compared to a threshold and based on the determination, a change may be detected within the block. If the infinity-norm difference between corresponding orthogonally transformed blocks is greater than the predetermined threshold, a change is deemed to be detected within the block. If the infinity-norm difference is not greater than the predetermined threshold, a change is deemed not detected. In image 612, the blocks which include a change are illustrated as white, and the blocks that do not include a change are illustrated as black.

Figure 7:
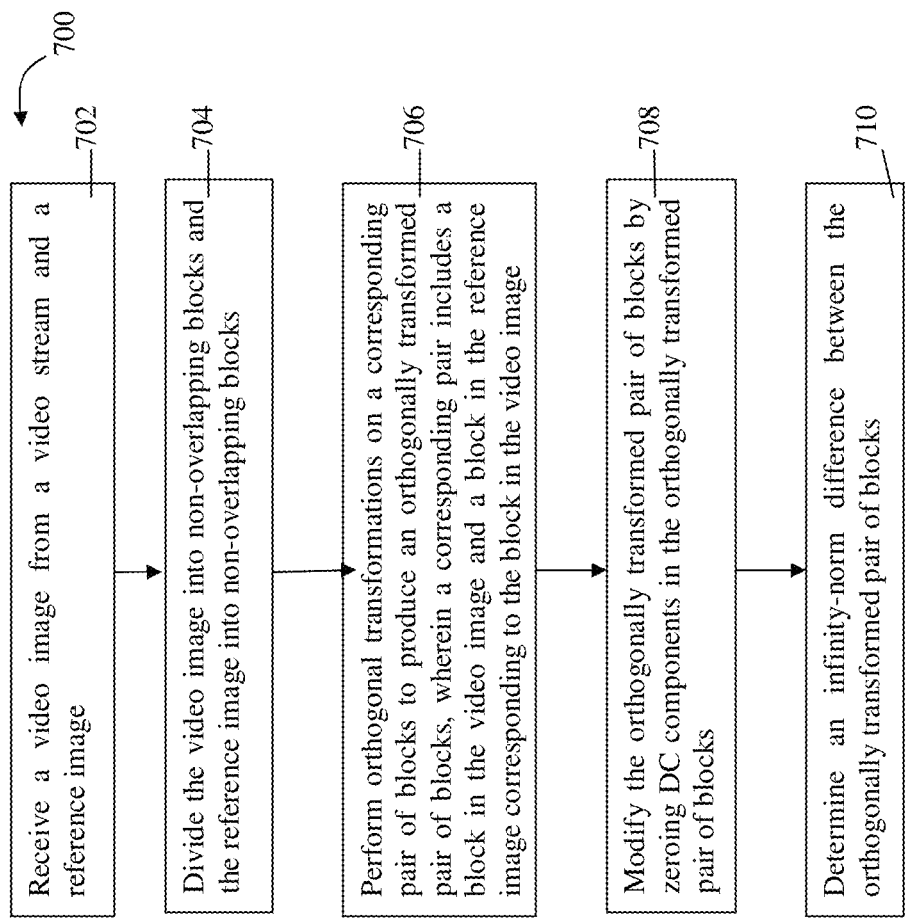
FIG. 7 is a block diagram of a method of change detection, according to embodiments of the invention.

FIG. 7 is a block diagram of a method of change detection, according to embodiments of the invention. A video analytics or surveillance system may include a memory, a processor, and a video camera to monitor a scene or background. In operation 702, the processor, for example, may receive a video image from a video stream and a reference image. The video image may be received from the video camera as a live feed, for example, or may be received from a server or other memory that stores a recording of a video stream. The reference image may be a stored image that indicates a non-interesting version of the scene or background. In operation 704, the processor may divide the video image into non-overlapping blocks and the reference image into non-overlapping blocks. In operation 706, the processor may perform orthogonal transformations on a corresponding pair of blocks to produce an orthogonally transformed pair of blocks. A corresponding pair may include a block in the video image and a block in the reference image corresponding to the block in the video image. In operation 708, the processor may modify the orthogonally transformed pair of blocks by zeroing DC components in the orthogonally transformed pair of blocks. The processor may further modify the orthogonally transformed pair of blocks by applying local scaling factors, for example. In operation 710, the processor may determine an infinity-norm difference between the modified orthogonally transformed pair of blocks.

Other or different operations may be performed.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A method for detecting change, comprising:
   a) receiving, by a processor, a video image from a video stream and a reference image;
   b) dividing, by the processor, the video image into non-overlapping blocks and the reference image into non-overlapping blocks;
   c) performing, by the processor, orthogonal transformations on a first corresponding pair of blocks to produce an orthogonally transformed pair of blocks, wherein a corresponding pair includes a first block in the video image and a first block in the reference image corresponding to the first block in the video image;
   d) modifying, by the processor, the orthogonally transformed pair of blocks by zeroing average value components in the orthogonally transformed pair of blocks;
   e) determining, by the processor, an infinity-norm difference between the modified orthogonally transformed pair of blocks by:
      subtracting each component in the first block in the video image, from a corresponding component in the first block in the reference image;
      determining an absolute value of each subtraction; and
      selecting the maximum value from the resulting absolute values,
   f) comparing the determined infinity-norm difference to a first threshold; and
   g) if the determined infinity-norm difference is greater than the first threshold, repeating steps c)-e) for a second corresponding pair of blocks, wherein the second corresponding pair of blocks includes a second block in the video image and a second block in the reference image corresponding to the second block in the video image, and wherein the second block in the video image overlaps with the first block in the video image and the second block in the reference image overlaps with the first block in the reference image.

2. The method of claim 1, comprising comparing the determined infinity-norm difference to a threshold.

3. The method of claim 1, comprising detecting a change within the first block in the video image if the infinity-norm difference is greater than a threshold.

4. The method of claim 1, comprising:
   comparing an infinity-norm difference between orthogonal transformations of the first or second corresponding pair of blocks to a second threshold that is higher than the first threshold; and
   detecting a change within a block in the video image if the block's respective infinity-norm difference is greater than the second threshold.

5. The method of claim 1, wherein the reference image is a predetermined stored image.

6. The method of claim 1, wherein the reference image is an image previous to the video image in the video stream.

7. The method of claim 1, wherein the orthogonal transformation is a discrete cosine transform or a fast wavelet transform.

8. A change detection system, comprising:
   a memory; and
   a processor configured to:
   a) receive a video image from a video stream and a reference image;
   b) divide the video image into non-overlapping blocks and the reference image into non-overlapping blocks;
   c) perform orthogonal transformations on a first corresponding pair of blocks, to produce an orthogonally transformed pair of blocks, wherein a corresponding pair includes a first block in the video image and a first block in the reference image corresponding to the first block in the video image;
   d) modify the orthogonally transformed pair of blocks by zeroing average value components in the orthogonally transformed pair of blocks;
   e) determine an infinity-norm difference between the modified orthogonally transformed pair of blocks by:
      subtracting components in the first block in the video image, each from a corresponding component in the first block in the reference image;
      determining an absolute value of each subtraction; and
      selecting the maximum value from the resulting absolute values,
   f) compare the determined infinity-norm difference to a first threshold; and
   g) if the determined infinity-norm difference is greater than the first threshold, repeat steps c)-e) for a second corresponding pair of blocks, wherein the second corresponding pair of blocks includes a second block in the video image and a second block in the reference image corresponding to the second block in the video image, and wherein the second block in the video image overlaps with the first block in the video image and the second block in the reference image overlaps with the first block in the reference image.

9. The system of claim 8, wherein the processor is further configured to detect a change within the first block in the video image if the infinity-norm difference is greater than a threshold.

10. The system of claim 8, wherein the processor is further configured to produce an alert based on the determined infinity-norm difference.

11. The system of claim 8, wherein the processor is further configured to:
compare an infinity-norm difference between orthogonal transformations of the first or second corresponding pair of blocks to a second threshold that is higher than the first threshold; and
detect a change within a block in the video image if the block's respective infinity-norm difference is greater than the second threshold.

12. The system of claim 8, wherein the reference image is an image previous to the video image in the video stream.

13. The system of claim 8, wherein the orthogonal transformation is a discrete cosine transform or a fast wavelet transform.

14. A change detection device, comprising:
a video camera configured to receive a stream of video images;
a memory configured to store a reference image; and
a processor configured to:
divide the reference image into sections;
perform an orthogonal transformation of each section in the reference image, thereby producing orthogonally transformed sections in the reference image;
zero an average value component in each orthogonally transformed section in the reference image; and
for each video image:
a) divide the video image into non-overlapping sections, each non-overlapping section corresponding to a section in the reference section;
b) perform an orthogonal transformation on each non-overlapping section in the video image, thereby producing orthogonally transformed sections;
c) zero an average value component in each of the orthogonally transformed sections in the video image;
d) determine an infinity-norm difference between each of the orthogonally transformed sections in the video image and the corresponding orthogonally transformed sections in the reference image by:
subtracting components in each section in the video image, from a corresponding component in a corresponding section in the reference image;
determining an absolute value of each subtraction; and
selecting the maximum value from the resulting absolute values,
f) compare the determined infinity-norm difference to a first threshold; and
g) if the determined infinity-norm difference is greater than the first threshold, repeat steps c)-e) for a second corresponding pair of blocks, wherein the second corresponding pair of blocks includes a second block in the video image and a second block in the reference image corresponding to the second block in the video image, and wherein the second block in the video image overlaps with the first block in the video image and the second block in the reference image overlaps with the first block in the reference image.

15. The device of claim 14, wherein the processor is further configured to detect a change within a section in a video image if the infinity-norm difference between the section and the corresponding section in the reference image is greater than a threshold.

16. The device of claim 14, wherein the processor is further configured to produce an alert based on the detected change within a section in a video image.

17. The device of claim 14, wherein the video camera is a thermal camera.

* * * * *